(12) United States Patent  (10) Patent No.: US 8,991,065 B1
Schrock  (45) Date of Patent: Mar. 31, 2015

(54) SPACING GAUGE WITH THERMAL INDICIA FOR SOLAR PANEL MOUNTING SYSTEMS

(71) Applicant: Sunmodo Corporation, Vancouver, WA (US)

(72) Inventor: Clifford Schrock, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 14/551,058

(22) Filed: Nov. 23, 2014

Related U.S. Application Data

(62) Division of application No. 13/872,759, filed on Apr. 29, 2013.

(51) Int. Cl.
 *G01B 5/14* (2006.01)

(52) U.S. Cl.
 CPC .......................................... *G01B 5/14* (2013.01)
 USPC ............................................ 33/613; 33/679.1

(58) Field of Classification Search
 CPC ............. G01B 3/004; G01B 5/14; G01B 5/25
 USPC ....................... 33/494, 555.3, 613, 645, 679.1
 See application file for complete search history.

(56) References Cited

U.S. PATENT DOCUMENTS

| | | | | |
|---|---|---|---|---|
| 4,930,225 | A | * | 6/1990 | Phillips ............................ 33/613 |
| 5,628,119 | A | * | 5/1997 | Bingham et al. ................. 33/613 |
| 6,973,737 | B2 | * | 12/2005 | Terrazas .......................... 33/494 |
| 7,434,362 | B2 | | 10/2008 | Liebendorfer |
| 7,971,398 | B2 | | 7/2011 | Tweedie |
| 8,109,048 | B2 | | 2/2012 | West et al. |
| 8,136,310 | B2 | | 3/2012 | Tweedie |
| 8,250,829 | B2 | | 8/2012 | McPheeters et al. |
| 2002/0083610 | A1 | * | 7/2002 | Camara et al. .................. 33/645 |
| 2009/0100694 | A1 | * | 4/2009 | Hooks .............................. 33/645 |
| 2011/0023390 | A1 | | 2/2011 | Kneip et al. |
| 2011/0126881 | A1 | | 6/2011 | Hong et al. |

(Continued)

FOREIGN PATENT DOCUMENTS

| | | |
|---|---|---|
| DE | 10136147 B4 | 11/2004 |
| EP | 2461120 A2 | 6/2012 |
| JP | 08284351 A | 10/1996 |

OTHER PUBLICATIONS

S5! Thermal Movement: What About Thermal Movement?, accessed on the Internet at: http://www.s-5.com/clamps/Index.cfm?Entity=4&Department=31&This_TopicOrder=1&This_SubtopicOrder=16, on Nov. 12, 2012.

(Continued)

*Primary Examiner* — G. Bradley Bennett
(74) *Attorney, Agent, or Firm* — Stone Creek Services LLC; Alan M. Flum

(57) ABSTRACT

Disclosed are devices and a system for compensating for thermal expansion and contraction of rail mounted solar panel rooftop systems. In one aspect, a floating end clamp that secures a solar panel in slidable captive cooperation with a mounting rail. In another aspect, a rail splice bridges two mounting rails with a gap between the rails for thermal expansion and contraction. The rail splice includes indicia for setting the gap distance between rails based on ambient temperature at the time of installation. In another aspect, a spacing gauge includes indicia for setting the gap distance between rails based on ambient temperature at the time of installation.

4 Claims, 19 Drawing Sheets

(56) References Cited

U.S. PATENT DOCUMENTS

| | | | |
|---|---|---|---|
| 2011/0314751 A1 | 12/2011 | Jette | |
| 2012/0298186 A1 | 11/2012 | West | |
| 2012/0298187 A1 | 11/2012 | Kim et al. | |
| 2012/0298188 A1 | 11/2012 | West et al. | |
| 2014/0223755 A1* | 8/2014 | Madrack | 33/645 |
| 2014/0230262 A1* | 8/2014 | Lounsbury | 33/645 |
| 2014/0304998 A1* | 10/2014 | Zhang | 33/545 |

OTHER PUBLICATIONS

Zep System II PV Module Installation System, Datasheet, Nov. 8, 2010, p. 2, Zep Solar Inc., San Raefel, CA, US.
Zep System II PV Installation Manual, Version 1.0, Jul. 9, 2010 Zep Solar Inc., pp. 4, 7, 15-16, 22, Zep Solar Inc., San Raefel, CA, US.
Zep System II PV Installation Manual, Version 2.0, Feb. 22, 2011 Zep Solar Inc., pp. 4, 14, 17, 19, 21, Zep Solar Inc., San Raefel, CA, US.
Zep Solar Flat Tool, Document #800-0161-001 Rev C, Aug. 15, 2012, Zep Solar Inc., San Raefel, CA, US.
Roof Mounting System, Engineering & Design Guide, 2012 Edition v1.21, Nov. 28, 2012, Ironridge Inc., Willits, CA, US.
Mounting Systems Inc Lightweight Rail, Solar, 2PK, accessed on the Internet at: http:/lwww.grainger.com/Grainger/MOUNTING-SYS-TEMS-INC-Lightweight-Rail-32J601?cm_sp=IO-_-IDP-_-RR_TopSellers&cm_vc=IDPRRZ1 on Dec. 26, 2012.
Renusol VS Solar PV Mounting System for Pitched Roof Applications, Oct. 1, 2012, Renusol America, Atlanta, GA, US.
Renusol VS Installation Guide, Oct. 1, 2012, Renusol America, Atlanta, GA, US.
Splices/Expansion Joints Installation Manual 908.3, Oct. 2010, Unirac, Inc., Albuquerque, NM.
Unirac Technical Bulletin: TB-110919-1300-0, Dec. 2011, Unirac, Inc., Albuquerque, NM.

* cited by examiner

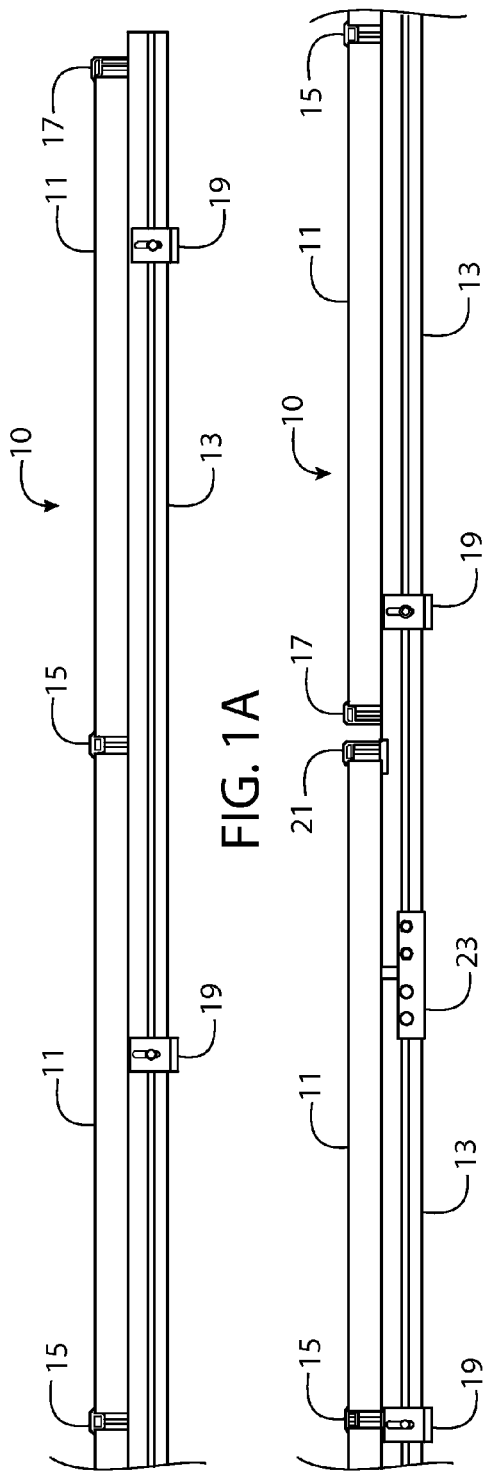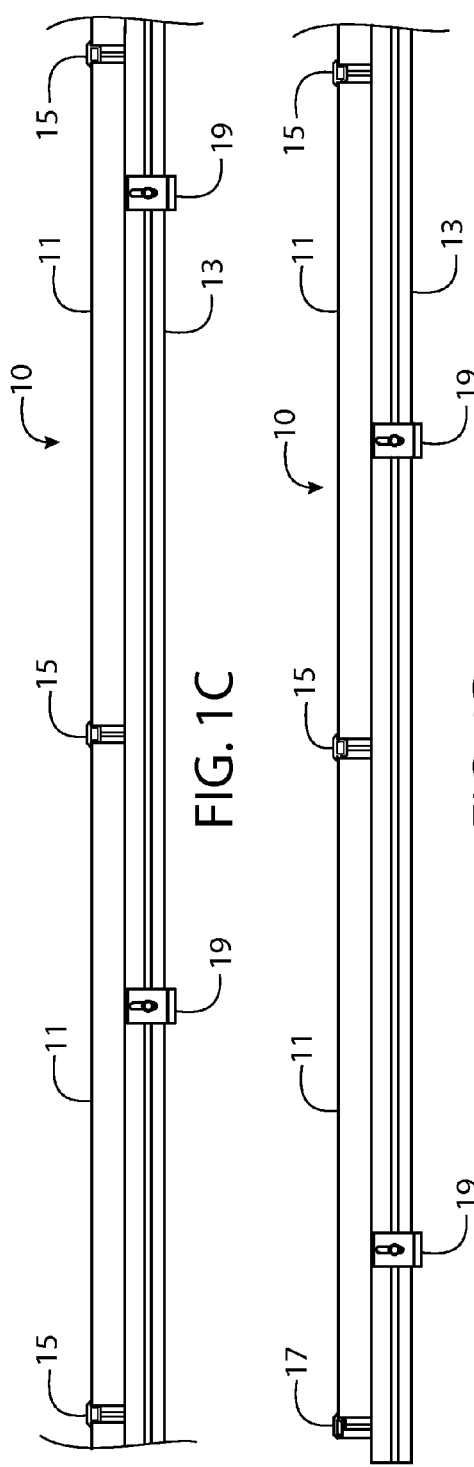

SPACING GAUGE WITH THERMAL INDICIA FOR SOLAR PANEL MOUNTING SYSTEMS

CROSS REFERENCE

This application is a divisional of U.S. patent application Ser. No. 13/872,759 filed on Apr. 29, 2013. The entire contents of U.S. patent application Ser. No. 13/872,759 are hereby incorporated by reference.

BACKGROUND

The present disclosure relates to solar photovoltaic (PV) panels systems and solar hot water systems, herein collectively referred to as solar panel systems. Specifically, the disclosure relates to an apparatus and system that compensates for thermal expansion and contraction of components in a solar panel system.

Solar panel systems, and in particular, rooftop mounted solar panel systems are generally susceptible to the weather. This includes seasonal and daily temperature changes. For example, in a dry or desert climate, temperatures may vary between day and night by as much as 60° F. (33.3° C.). In some regions of the United States, temperatures can vary seasonally by over 150° F. (83.3° C.). These temperature variations can cause significant expansion and contraction to solar PV panels or solar hot thermal panels, collectively referred to herein as solar panels, and to their mounting rails. This is particularly apparent when the solar panels are mounted in a continuous run of 100 ft. (30.48 m) to 300 ft. (91.44 m) or more. For example, a solar panel installation with a 100 ft. (30.48 m) run of aluminum mounting rail can expand or contract approximately 1.5 in (0.038 m) over a seasonal variation of 100° F. (54.5° C.) typical in many regions of the world. For a 300 ft. (91.44 m) run of solar panels that expansion and contraction would be approximately 4.5 in (0.114 m) over the same seasonal 100° F. (54.5° C.) temperature variation.

This expansion and contraction of solar panel system components can be challenging for concrete, and steel roof mounted solar panel system and can be particularly challenging for solar panel installations on wood sheathed roofs. For example, wood thermally expands 17%-22% of what aluminum would expand over the same given change in temperature. For the above mentioned 100° F. (54.5° C.) seasonal variation, a 100 ft. (30.48 m) length of wooden roof can expand as little as 0.25 in (0.0196 m) compared with 1.5 inches (0.038 m) for same length of the aluminum rail or back-to-back aluminum framed solar panels. This difference is enough to cause significant stress and possible buckling of components, including detachment of the mounting bolts, within the solar mounting system.

Attempts to solve this problem include creating thermal breaks or gaps between the a set length of rail, typically every 40 ft. (12.19 m) or 100 ft. (30.48 m) where there is a preset gap between both rail and solar panels on either side of the thermal break. This arrangement can be undesirable. For example, this arrangement dictates the structurally layout of the solar panels within the system making system planning challenging. It can also create gaps across solar panel arrays that may be aesthetically undesirable.

SUMMARY

This Summary introduces a selection of concepts in simplified form that are described the Description. The Summary is not intended to identify essential features or limit the scope of the claimed subject matter.

Disclosed are devices and a system for compensating for thermal expansion and contraction of rail mounted solar panel rooftop systems. The solar panel rooftop system includes mounting rails for securing the solar panels to the roof. The solar panels are secured to the mounting rails by end clamps and mid-clamps. In one aspect, a floating end clamp assembly secures a solar panel in slidable captive cooperation with a mounting rail. The floating end clamp assembly includes a floating end clamp base with a portion slidable and captive to the mounting rail and an end clamp that secures the solar panel to the floating end clamp base by a threaded fastener.

In another aspect, a rail splice bridges two mounting rails with a gap between the rails for thermal expansion and contraction. The rail splice can be non-movably secured to one of the rails and secured to the other rail in slidable captive cooperation. The rail secured in slidable captive cooperation has one degree of freedom to expand and contract relative to the rail splice and other mounting rail.

The rail splice includes indicia for setting the gap distance between rails based on ambient temperature at the time of installation. The indicia are calibrated for specific mounting rail material, ambient temperature extremes, and rail length between gaps. For example, the indicia can be calibrated for an aluminum, steel, or fiberglass mounting rails. The rail splice indicia can be calibrated for any mounting rail length. For example, the rail splice indicia can be calibrated for 40 ft. (12.19 m), 100 ft. (30.48 m), 200 ft. (61 m), or 300 ft. (91.4 m) lengths between gaps. These rail lengths are typical for solar panel installations.

Rail mounted solar panel installations with thermal expansion gaps generally do not allow solar panels to bridge the gap because this would create a rigid connection between the rails defeating the purpose of the gap. However, a solar panel installation utilizing a floating end clamp assembly to secure a solar panel that bridges the mounting rails creates a floating connection between the mounting rails. This affords the possibility for much more flexible installations than rail mounted solar panel systems with only rigidly mounted clamps.

In another aspect, a spacing gauge includes indicia for setting the gap distance between rails based on ambient temperature at the time of installation. The indicia are calibrated for a specific length between rail gaps, ambient temperature extremes, and rail material. For example, the indicia can be calibrated for an aluminum, steel, fiberglass, or other suitable material for rooftop mounted solar panel mounting rails. The rail splice indicia can be calibrated for any mounting rail length. The indicia can be printed, hot stamped, silkscreened, or otherwise applied along a wedge portion of the spacing gauge. The spacing gauge can include an optional handle portion or the wedge portion can include an integral handle.

DRAWINGS

FIGS. 1A-1D each show, in side view, sections of a solar panel and rail system.

DESCRIPTION

Figure 2:
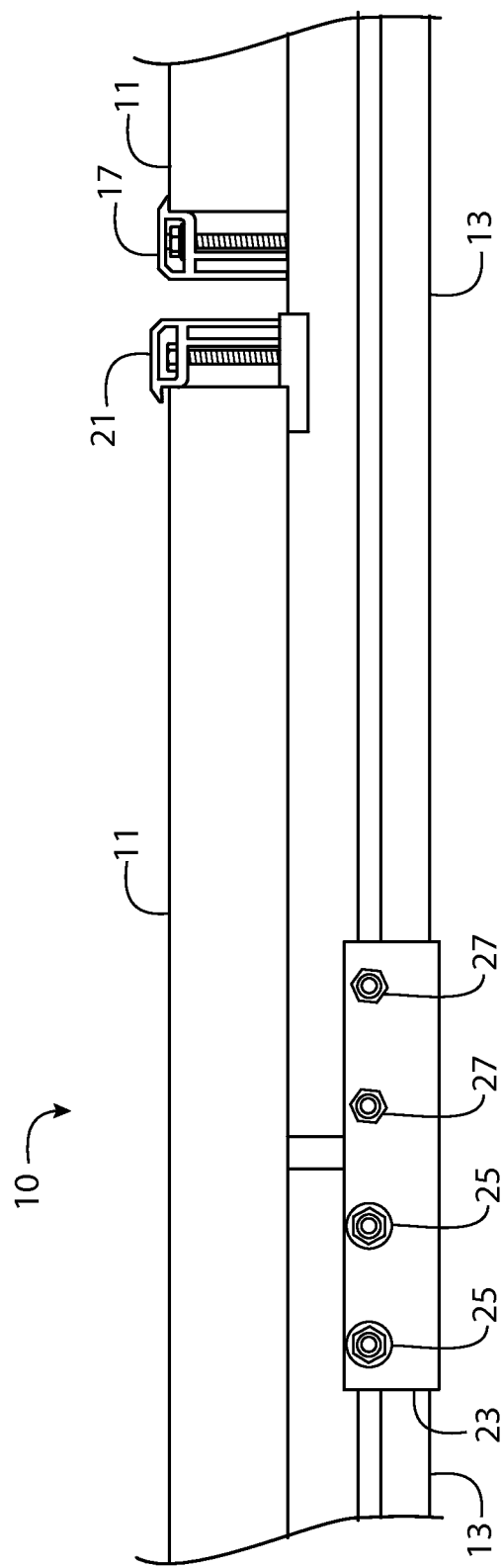
FIG. 2 shows a detailed view of a section of FIG. 1B illustrating the sliding end clamp and rail splice in combination.

Certain terms, for example, "horizontal", "vertical", "left-side", and "right-side" are relative terms and refer to the relative relation of the elements as presented in the figures; they are not meant to limit the meaning or scope of the claims.

The following description is made with reference to figures, where like numerals refer to like elements throughout the several views, FIGS. 1A-1D each show, in side view, a section of a solar panel system 10. FIGS. 1A-1D each show one or more solar panels 11 secured to mounting rails 13 by mid-clamps 15. In FIGS. 1A, 1B, and 1D, end clamps 17 secure the solar panels 11 to the mounting rails 13. In FIGS. 1A-1D, mounting brackets 19 secure the mounting rails 13 to a roof surface. FIG. 1A shows the right most portion, FIG. 1B shows the right central portion, FIG. 1C shows the left central portion, and FIG. 1D shows the left most portion of the solar panel system 10.

The solar panel system 10 of FIGS. 1A-1D include a floating end clamp assembly 21 and a rail splice 23, both shown in FIG. 1B, that in combination, allow the solar panels 11 and the mounting rails 13 to expand and contract with corresponding changes in temperature. One way to facilitate thermal expansion is to place a gap between the mounting rails 13 that joined by the rail splice 23 and similarly between the floating end clamp assembly 21 and the end clamp 17 adjacent to the floating end clamp assembly 21. This disclosure will detail apparatus for setting the gap width based on current ambient temperature, material of the mounting rails 13, and maximum expected ambient temperature.

Figure 3:
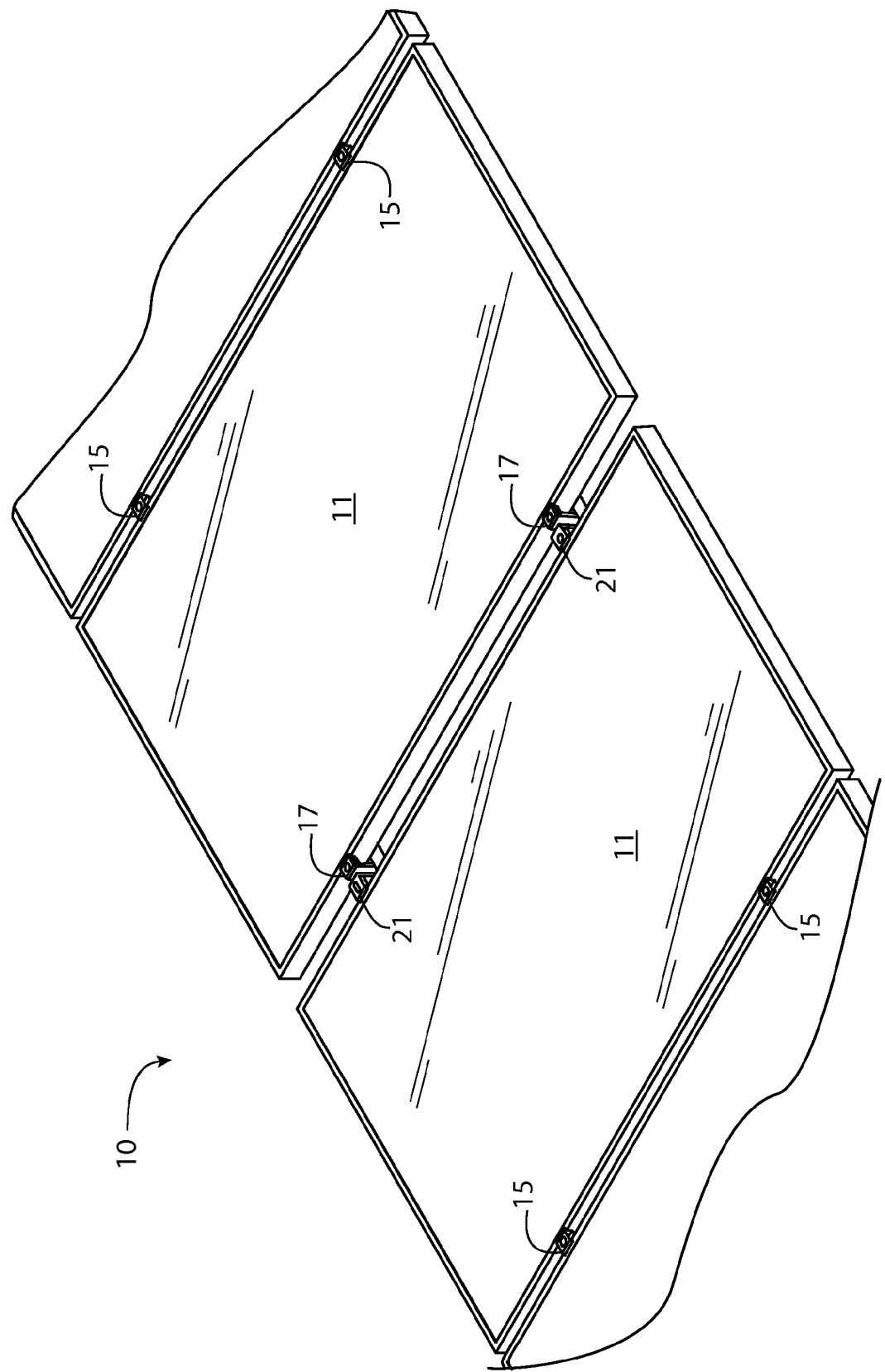
FIG. 3 shows a top perspective view of FIG. 1B.
Figure 4:
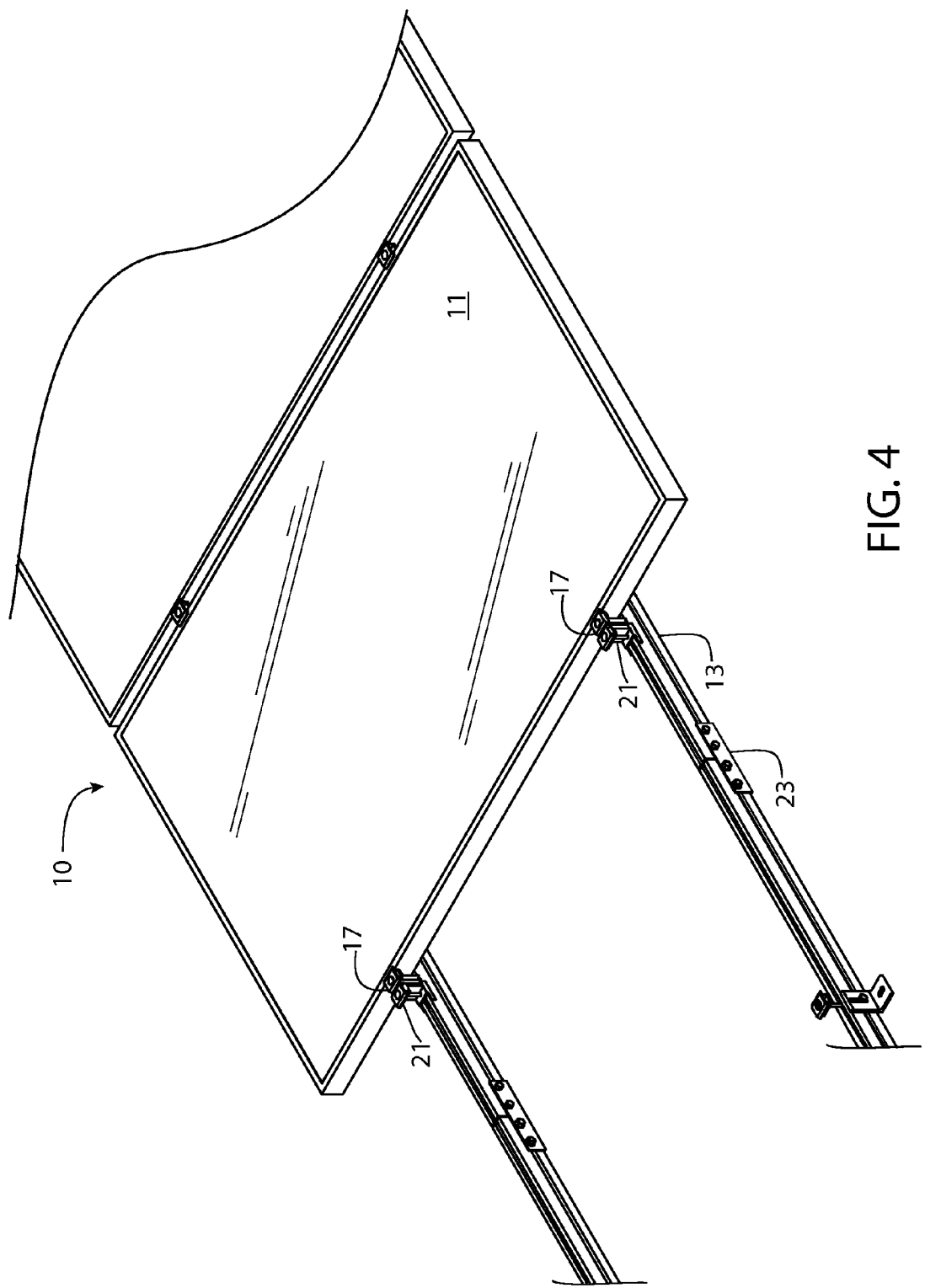
FIG. 4 shows the solar panel and rail system of FIG. 3 with one of the solar panels removed for clarity.
Figure 5:
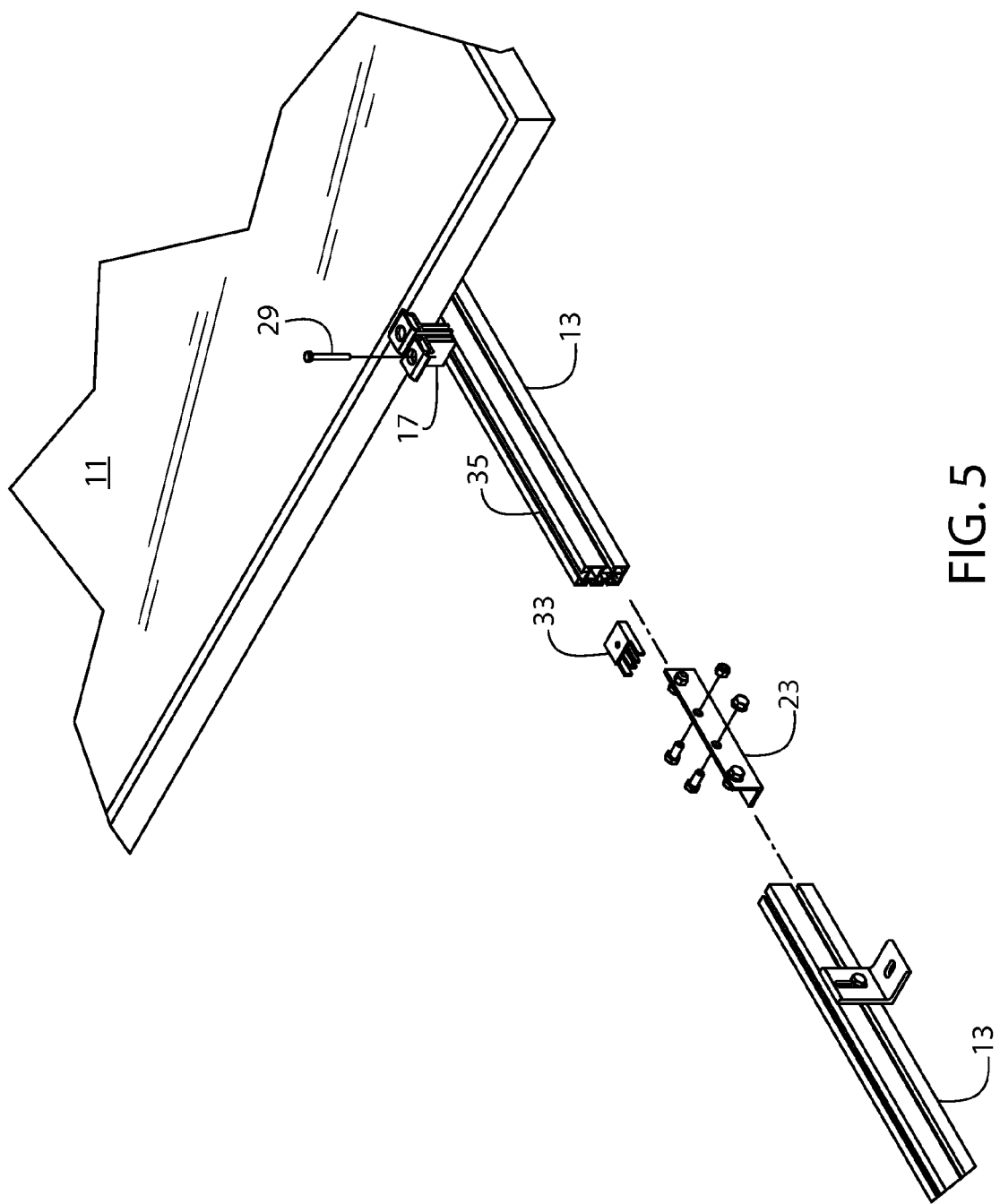
FIG. 5 shows a partially exploded view of a portion of FIG. 4.
Figure 6:
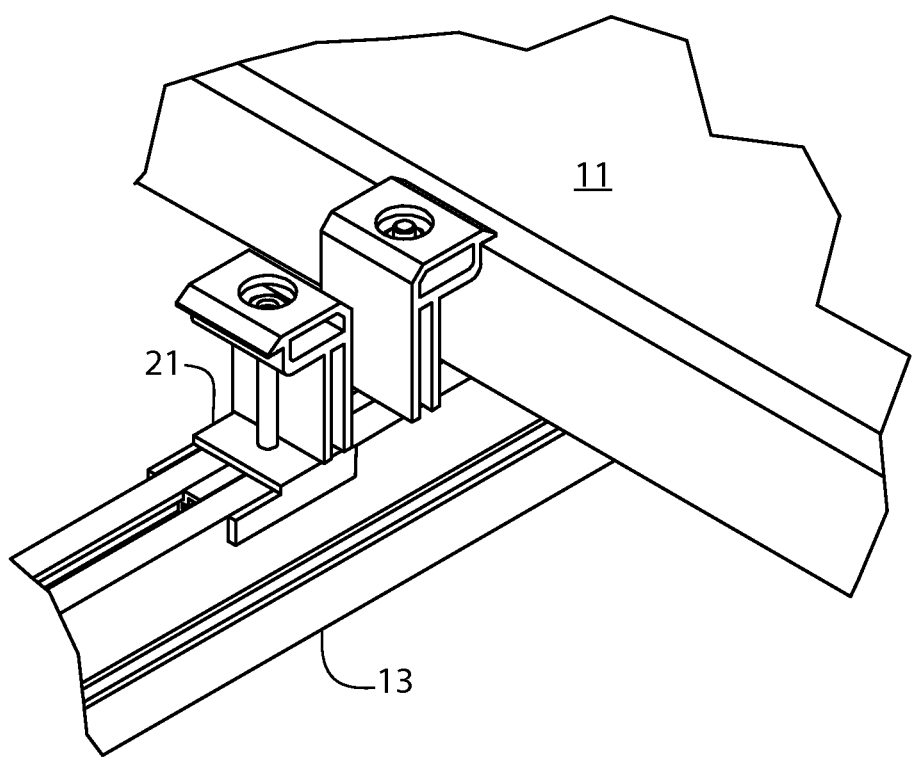
FIG. 6 shows a detailed view of the sliding end clamp portion of FIG. 5.
Figure 7:
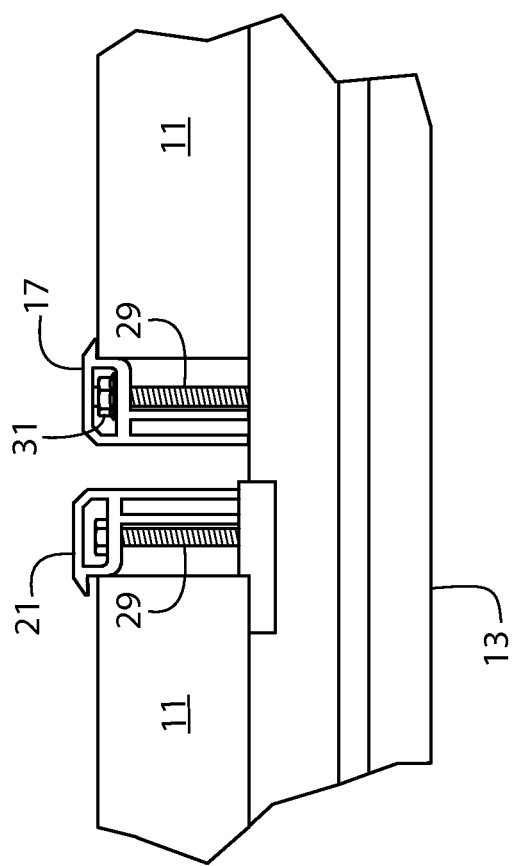
FIG. 7 shows a side detail view of a sliding end clamp securing a solar panel to the rail.

FIG. 2 shows a detailed view of a section of FIG. 1B illustrating the floating end clamp assembly 21 and rail splice 23 in combination. FIG. 3 shows a top perspective view of FIG. 1B showing the solar panels 11 in combination with the mid-clamps 15, the end clamps 17, and floating end clamp assembly 21. FIG. 4 shows the solar panel system 10 of FIG. 3 with one of the solar panels 11 removed for clarity to show the mounting rail 13 and rail splice 23. FIG. 5 shows a partially exploded view of a portion of FIG. 4 showing rail splice 23 separated from the mounting rails 13. FIG. 6 shows a detailed view of the floating end clamp assembly 21, mounting rail 13, and solar panel 11. FIG. 7 shows a side detail view of FIG. 6, but including the solar panel 11 on the left side to show the floating end clamp assembly 21 securing the solar panel 11 to the mounting rail 13.

Referring to FIGS. 1B and 2, 4, and 7, the end clamp 17 non-movably secures the solar panel 11 to the mounting rail 13, both of the right-hand side of the figure. In FIG. 7, a threaded fastener 29 and nut 31 non-movably secure the end clamp 17. The threaded fastener 29 shown securing the end clamp 17 on the right-hand side of FIG. 7 is a t-bolt. Screws, bolts with washers, or any threaded fastener, either alone or in combination with the nut 31 that can non-movably secure the end clamp 17 to the mounting rail 13 can be used in place of the t-bolt.

In FIGS. 1B and 2, the floating end clamp assembly 21 secures, in slidable captive cooperation, the solar panel 11 of the left portion of the figure, to mounting rail 13 of the right portion of the figure. In FIGS. 4-5, the floating end clamp assembly 21 of FIG. 4 is unobstructed by the solar panel 11 for clarity. In FIG. 5, the floating end clamp assembly 21 of FIG. 4 is shown in exploded view and includes a floating end clamp base 33, a threaded fastener 29, and an end clamp 17. The mounting rail 13 includes a top groove 35. The floating end clamp base 33 engages the top groove 35 in slidable captive cooperation. The threaded fastener 29 of FIGS. 5 and 7 for securing the solar panel 11 of FIGS. 4 and 7 to the floating end clamp assembly 21 is a standard hex head bolt. Other suitable threaded fasteners capable of securing the solar panel 11 to the floating end clamp assembly 21, can be used, for example, an Allen head bolt, or a threaded screw.

Referring to FIG. 1B, the mid-clamp 15 non-movably secures the opposing side of the solar panel 11 to the mounting rail 13. Referring to FIG. 2, fasteners 25 non-movably secure the mounting rail 13 on the left portion of the figure is to the rail splice 23. Floating fasteners 27 secure, in slidable captive cooperation, the mounting rail 13 on the right portion of the figure to the rail splice 23. This arrangement of mounting rail 13 and rail splice 23 allows the mounting rail 13 of the right hand portion of FIG. 2 to expand and contract as the ambient temperature changes by sliding in captive cooperation along the rail. The described arrangement of the floating end clamp assembly 21, solar panel 11, and the mounting rail 13, allows the solar panel 11 of the left portion of the figure and the mounting rail 13 of the right portion of the figure to move freely in slidable captive cooperation as various elements of the solar panel system 10 expand and contract with changes in ambient temperature.

Figure 8:
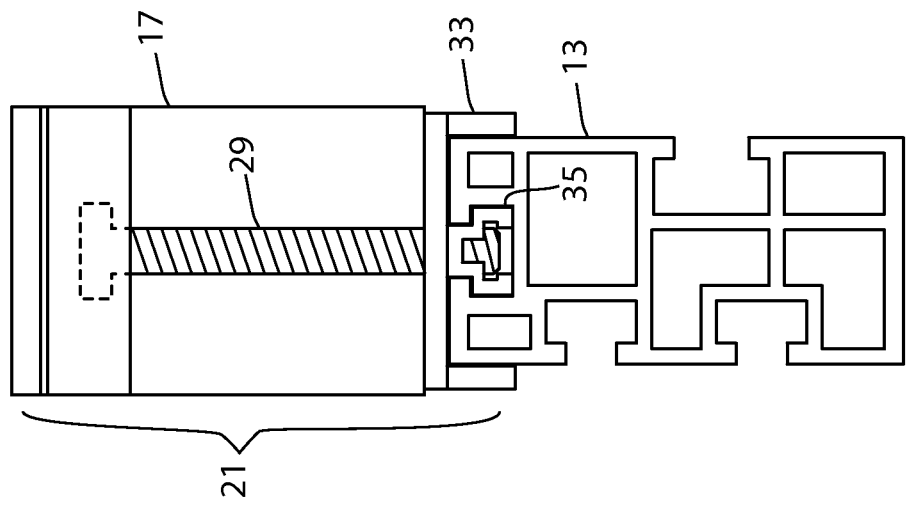
FIG. 8 shows an end view of sliding end clamp and mounting rail.

FIG. 8 shows an end view of floating end clamp assembly 21 and mounting rail 13. The floating end clamp assembly 21 includes the floating end clamp base 33 and the end clamp 17. The end clamp 17 the threaded fastener 29 secures the floating end clamp base 33. The threaded fastener 29 does not engage or bind the mounting rail 13 in order not to impede sliding of the floating end clamp base 33 along the mounting rail 13. The head of the threaded fastener 29 is hidden but is represented by broken lines for clarity.

Figure 9:
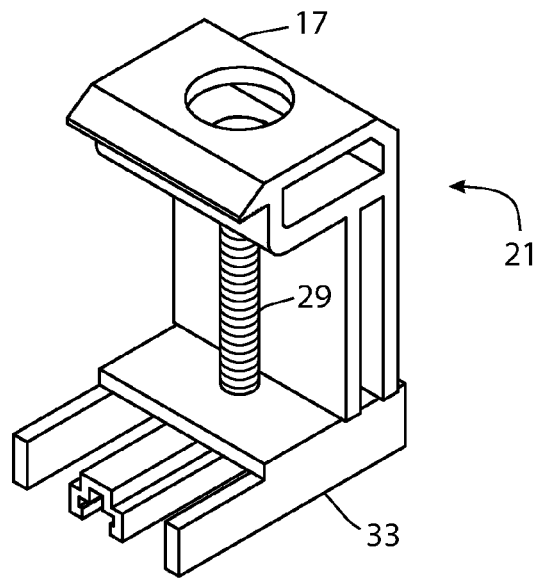
FIG. 9 shows a front perspective view of the sliding end clamp.
Figure 10:
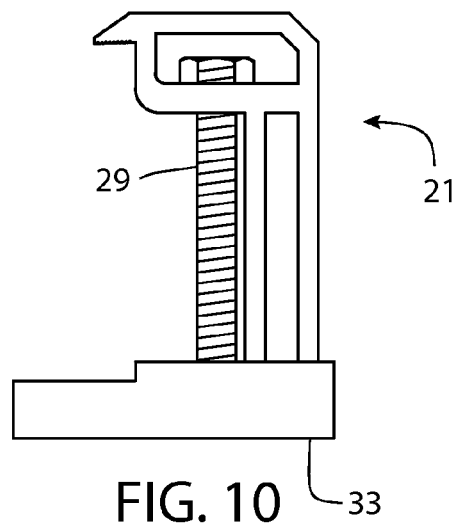
FIG. 10 shows a side view of the sliding end clamp.
Figure 11:
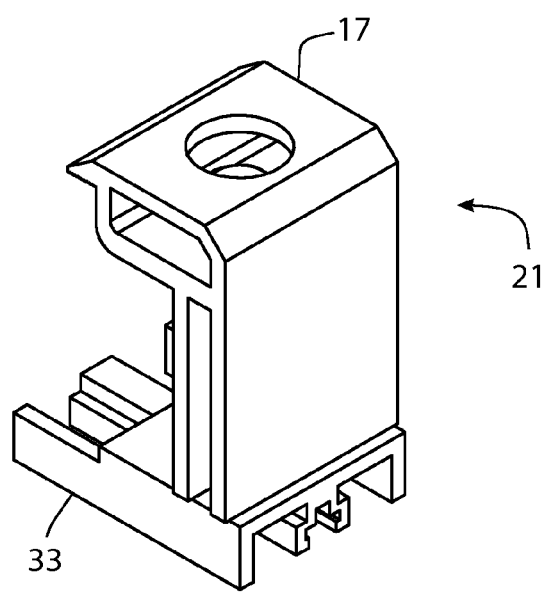
FIG. 11 shows a rear perspective view of the sliding end clamp.
Figure 12:
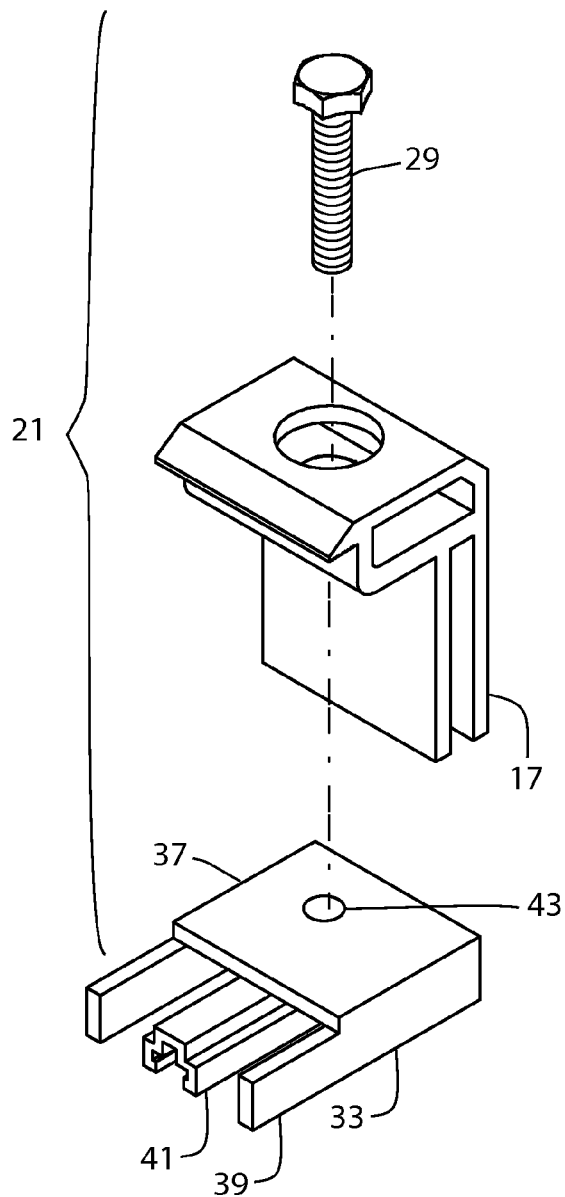
FIG. 12 shows an exploded front perspective view of the sliding end clamp.
Figure 13:
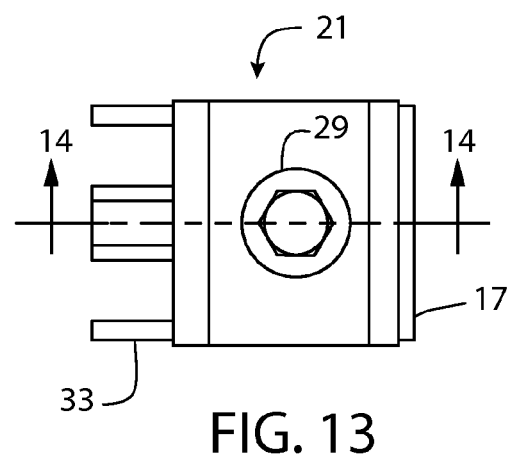
FIG. 13 shows a top view of the sliding end clamp.
Figure 14:
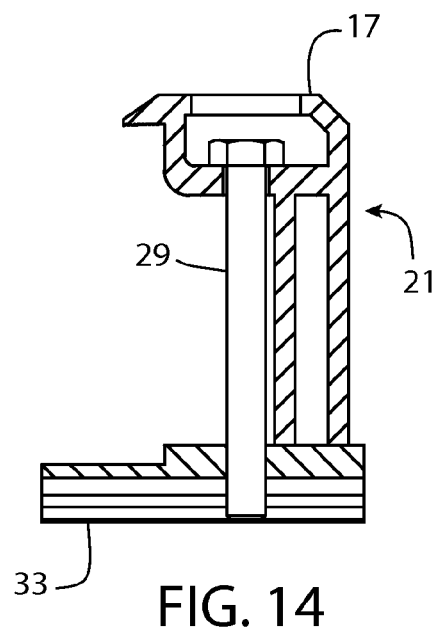
FIG. 14 shows a sectional view of FIG. 13, of the sliding end clamp.

FIGS. 9-14 show, in several views, the floating end clamp assembly 21 including the end clamp 17 and floating end clamp base 33. FIGS. 9-10 and 12-14 include the threaded fastener 29. The threaded fastener 29 is shown as a bolt, as previously described, but can be any suitable for securing a solar panel to the floating end clamp base 33 by the end clamp 17. FIG. 9 shows a front perspective view of the floating end clamp assembly 21. FIG. 10 shows a side view of the floating end clamp assembly 21. FIG. 11 shows a rear perspective view of the floating end clamp assembly 21. FIG. 12 shows an exploded perspective view of the floating end clamp assembly 21. FIG. 13 shows a top view of the floating end clamp assembly 21. FIG. 14 shows a sectional view of FIG. 13, of the floating end clamp assembly 21.

Referring to FIG. 12, the floating end clamp base 33 includes a top 37, sides 39, and an inner portion 41. The sides 39 are configured to slidably engage the vertical sides of the mounting rail 13 of FIGS. 5 and 8. The inner portion 41 is shaped to engage the top groove 35 of the mounting rail 13 of FIG. 5 is slidable captive cooperation. The inner portion 41 projects downward from the top 37. The shape of the inner portion 41 is shown complementary to the shape of the top groove 35 of FIG. 8 and fills the cross section of the of the top groove 35 cavity of FIG. 8. This allows the inner portion 41 to hold the floating end clamp base 33 in slidable captive cooperation. The floating end clamp base 33 is free to move along the length of the top groove 35 but is also held captive to the top groove 35 of FIG. 8. While the inner portion 41 is shown complementary in shape to the top groove 35 of FIGS. 5 and 8, other shapes that hold the floating end clamp base 33 in slidable captive cooperation can be used. In FIG. 12, the inner portion 41 can be held in slidable captive cooperation with the top groove 35 of FIG. 8, if a section of the inner portion 41 distal to the top 37 is wider than the external opening of the top groove 35 but narrower than the inside cavity of the top groove 35 of FIG. 8. The section of the inner portion 41 proximal to the horizontal base 37 is narrower than the top groove 35 of FIG. 8.

Referring to FIG. 8, in this arrangement, the inner portion 41 is slid into the top groove 35 at the end of the mounting rail 13. The top 37 in combination with the sides 39 straddle the rail. The sides 39 can provide stability as the floating end clamp assembly 21 slides along the rail. Referring to FIG. 12, a threaded aperture 43 engages the threaded fastener 29, and secures the end clamp 17 to the floating end clamp base 33.

Figure 15:
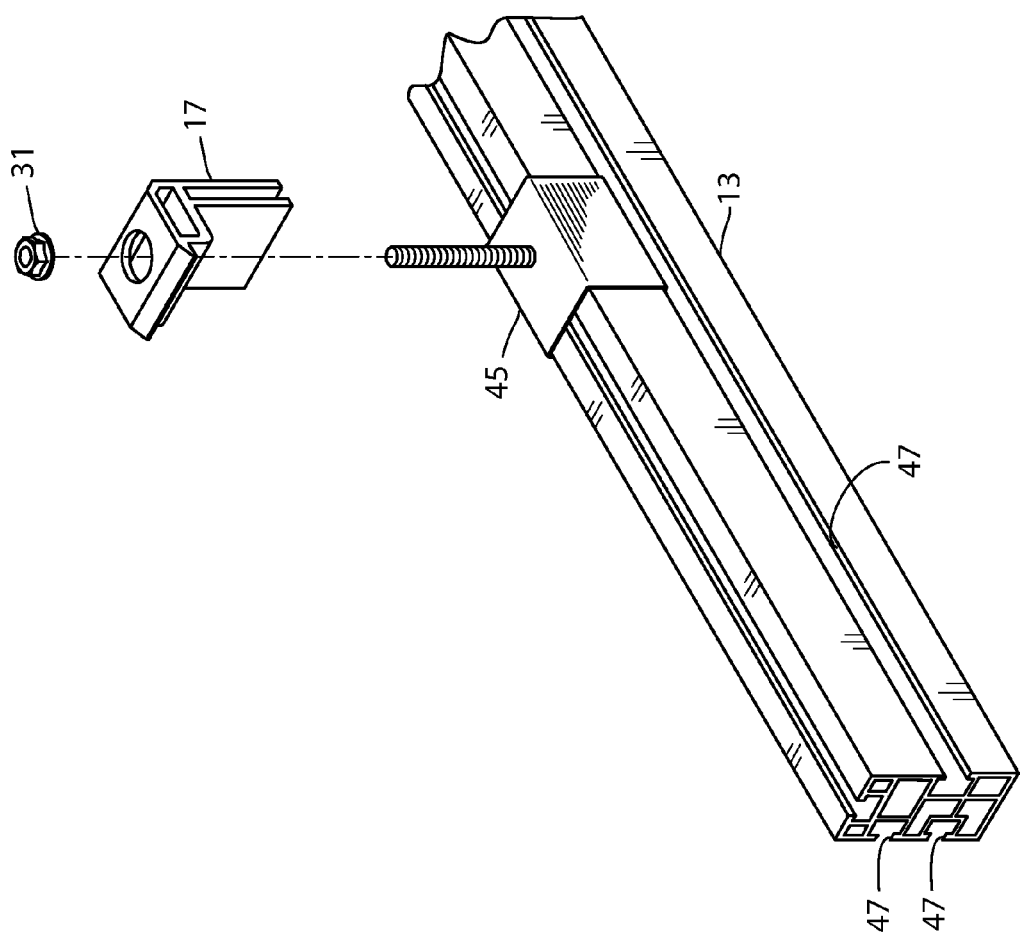
FIG. 15 shows, in a partially exploded view, an alternative floating end clamp base, end clamp, and nut.

In an alternative aspect, FIG. 15 shows a partially exploded view with a floating end clamp base 45, end clamp 17, and nut 31. The floating end clamp base 45 is engaged to the mounting rail 13 in slidable captive cooperation. The mounting rail 13 includes a plurality of side grooves 47.

Figure 16:
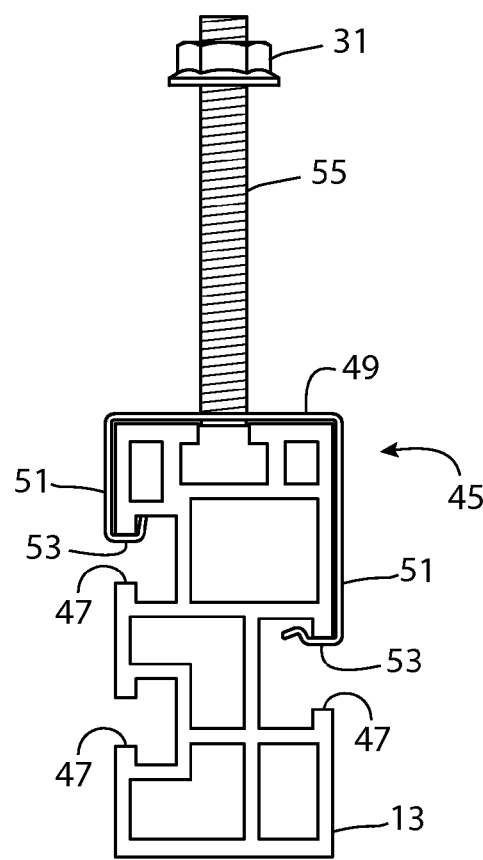
FIG. 16 shows an end view of the alternative floating end clamp base secured in slidable captive cooperation to the mounting rail.
Figure 17:
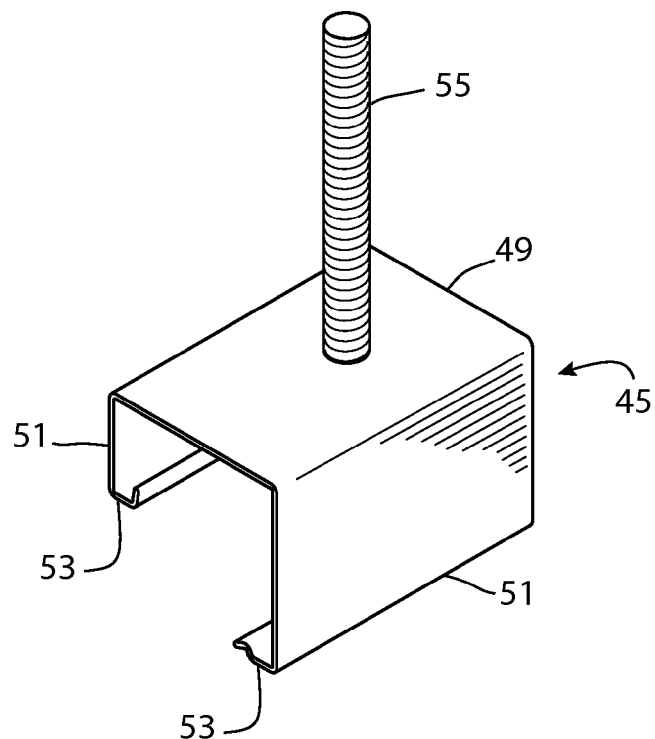
FIG. 17 shows a perspective view of the alternative end clamp base.

FIG. 16 shows an end view of the floating end clamp base 45 secured in slidable captive cooperation to the mounting rail 13. FIG. 17 shows a perspective view of the floating end clamp base 45. Referring to FIGS. 16-17, the floating end clamp base 45 includes a top portion 49 and side portions 51. Each side portion 51 projects downward from opposing edges of the top 49. The floating end clamp base 45 forms a modified u-shape. Each side portion 51 includes a bent or hooked end 53. The hooked end 53 is shaped to engage and hold the floating end clamp base 45 to the side groove 47 of FIG. 16. FIG. 16 shows two examples of hooked ends 53 capable of engaging and holding the floating end clamp base 45 to the side groove 47. In the illustrated example, one of the hooked ends 53 is u-shaped and the other of the hooked end 53 shown bent or formed with a slight inset. This combination allows hooked end 53 that is u-shaped to be pivoted into place first followed by snapping the hooked end 53 with the inset into place.

In FIGS. 16-17, the floating end clamp base 45 is shown with a threaded post 55 integral to the floating end clamp base 45. The threaded post 55 can be permanently joined to the top portion 49 of the floating end clamp base 45. Alternatively, the threaded post 55 can be screwed into threaded aperture, for example, a threaded insert. In FIG. 16, the nut 31 engages the threaded inserted. The nut 31 secures the end clamp 17 shown in FIG. 15, to the top of the top portion 49 of FIG. 16.

One of the problems recognized by the inventors is that leaving a gap of arbitrary distance between spliced mounting rails, may not be sufficient to allow for proper thermal expansion and contraction without taking into account the ambient temperature at the time of installation and the temperature variation for a given location. For example, a solar panel system installed in Wisconsin would have a very different temperature range than different temperature extremes than a moderate climate like Hawaii. FIGS. 18-30 apparatus that assist the installer to set the proper gap distance based on the combination of total rail length between gaps and the ambient temperature at the time of installation.

Figure 18:
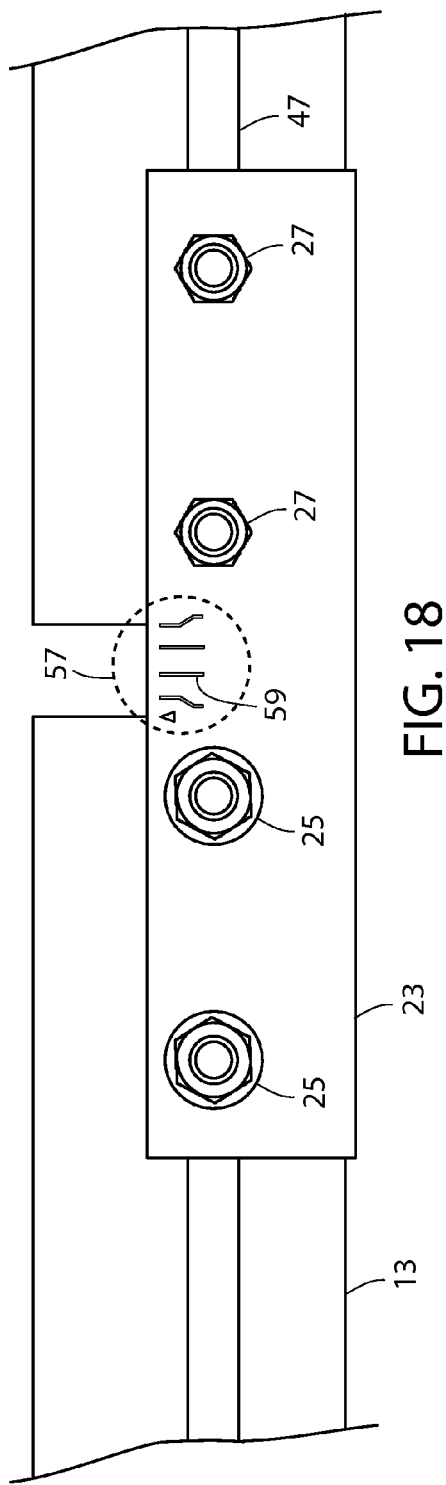
FIG. 18 shows the rail splice bridging two mounting rails, the rail splice including gap-setting indicia based on ambient temperature.
Figure 19:
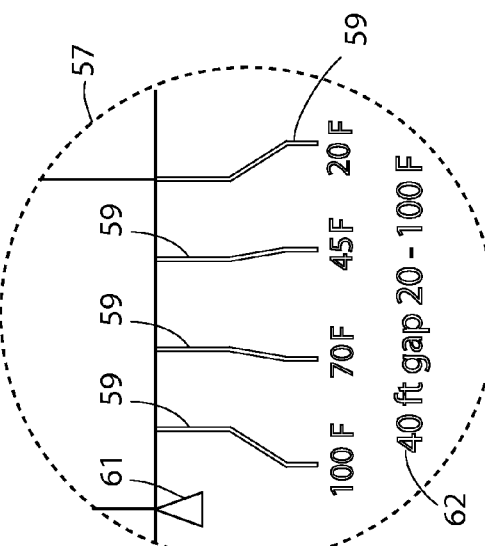
FIG. 19 shows a detailed view of a section of FIG. 18 showing the gap-setting indicia of the rail splice.
Figure 20:
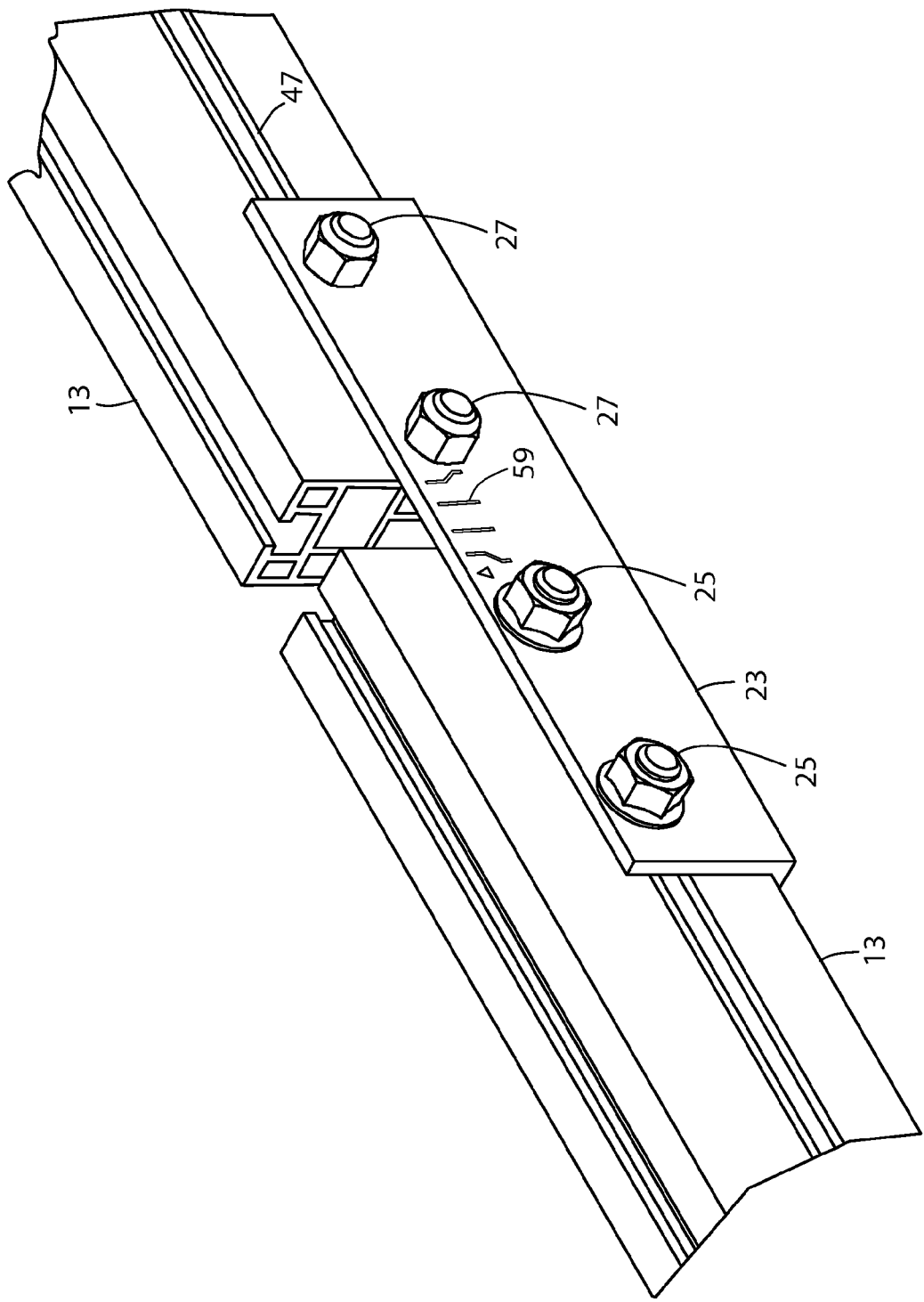
FIG. 20 shows a perspective view of the rail splice of FIG. 18.
Figure 21:
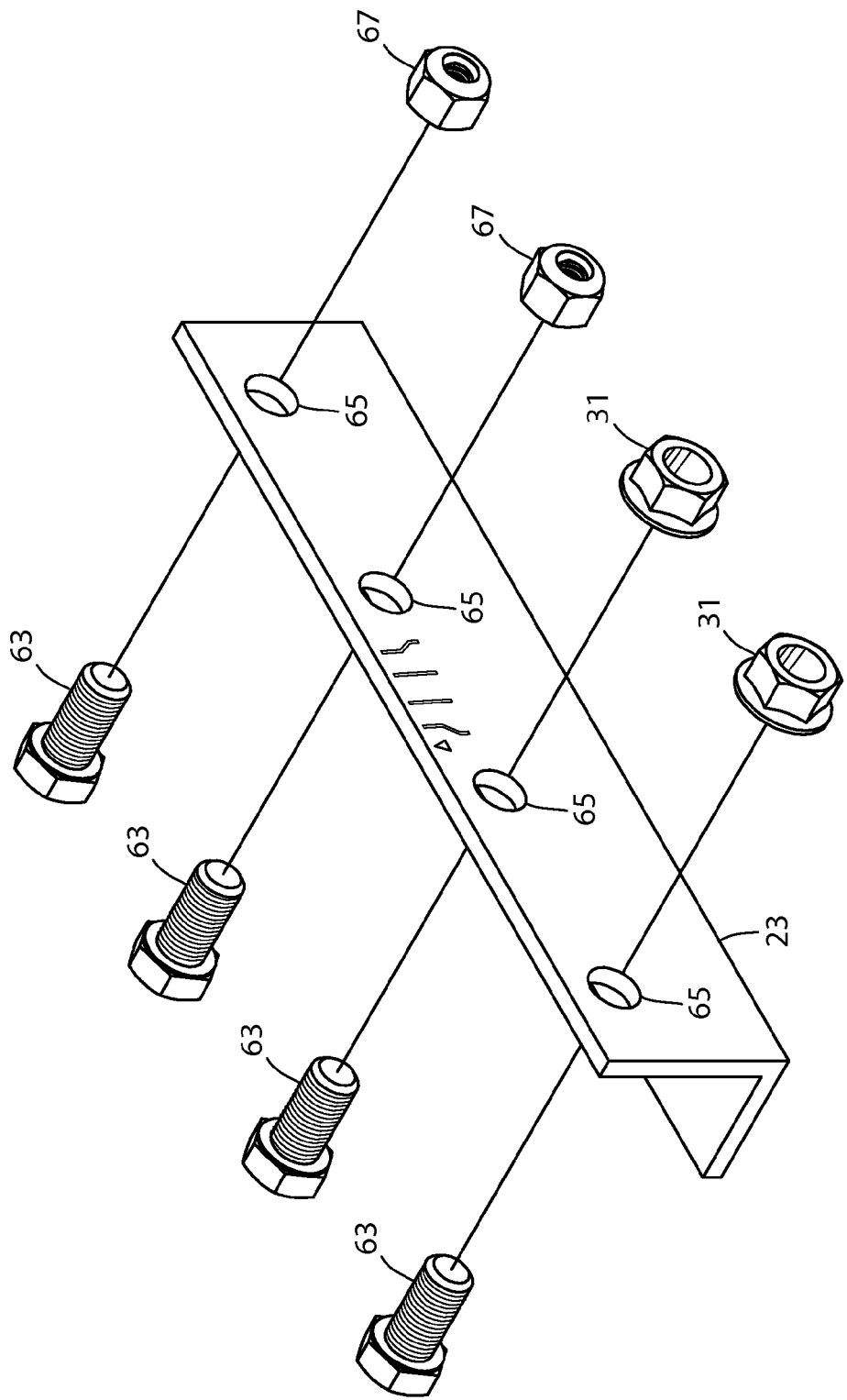
FIG. 21 shows an exploded view of the rail splice and associated fasteners of FIG. 18.

FIG. 18 shows the rail splice 23 mounted between the mounting rails 13 where the rail splice 23 includes indicia 59 for setting the gap. FIG. 19 shows the detailed section 57 of FIG. 18 showing the indicia 59 in detail. FIG. 20 shows a perspective view of FIG. 18 showing the rail splice 23 joining the mounting rails 13. The indicia 59 for setting the gap are also shown. FIG. 21 shows an exploded view of the rail splice 23 of FIG. 18.

Referring to FIG. 19, a reference mark indicium 61 indicates the recommended position for the end of the mounting rail 13 on the left-hand side of FIG. 18. The indicia 59 includes a plurality of temperature indicating text and reference marks for setting the position to set the mounting rail 13 on the right-hand side of FIG. 18 based on the ambient temperature at the time of installation. For example, if the ambient temperature was 0° F. (−17.8° C.) at the time of installation than end of the mounting rail 13 of the right side of FIG. 15 would be aligned proximate to the indicium 59 of FIG. 19 marked with "0 F". In addition to the indicia 59 for indicating the ambient temperature, FIG. 19 shows instruction indicia 62. The instruction indicia 62 can include instructions of how to use the rail splice 23. The instruction indicia 62 can include calibration information, as shown in FIG. 19, where the instruction indicia 62 indicates that the rail splice 23 was calibrated for 40 ft. (12.19 m) rail length and ambient temperatures from 20° F. (−6.7° C.)-100° F. (37.8° C.).

Referring to FIGS. 18 and 20, the fasteners 25 non-movably secure the mounting rail 13 on the left-hand side of the figure to rail splice 23. The floating fasteners 27 slidably secure the mounting rail 13 on the right-hand side of the figure the rail splice 23. The fastener 25 for non-movably securing the mounting rail 13 to the rail splice 23 can be a threaded bolt 63, or a shoulder-bolt, in combination with a nut 31, through an aperture 65 in the rail splice 23 as shown in FIG. 21. The floating fastener 27 of FIGS. 18 and 20 can be a threaded bolt 63 in combination with a nut that does not allow the bolt to extend passed its end portion; for example, a nylon or polymer insert lock nut 67, known in the trade as a nylock nut, as shown in FIG. 21. The threaded bolt 63, the polymer insert lock nut 67, and the aperture 65 combination of FIG. 21, allow the mounting rail 13 on the right-hand side of FIGS. 18 and 20 to slide in captive cooperation with the rail splice 23 along the side groove 47 also shown in FIGS. 18 and 20.

Figure 22:
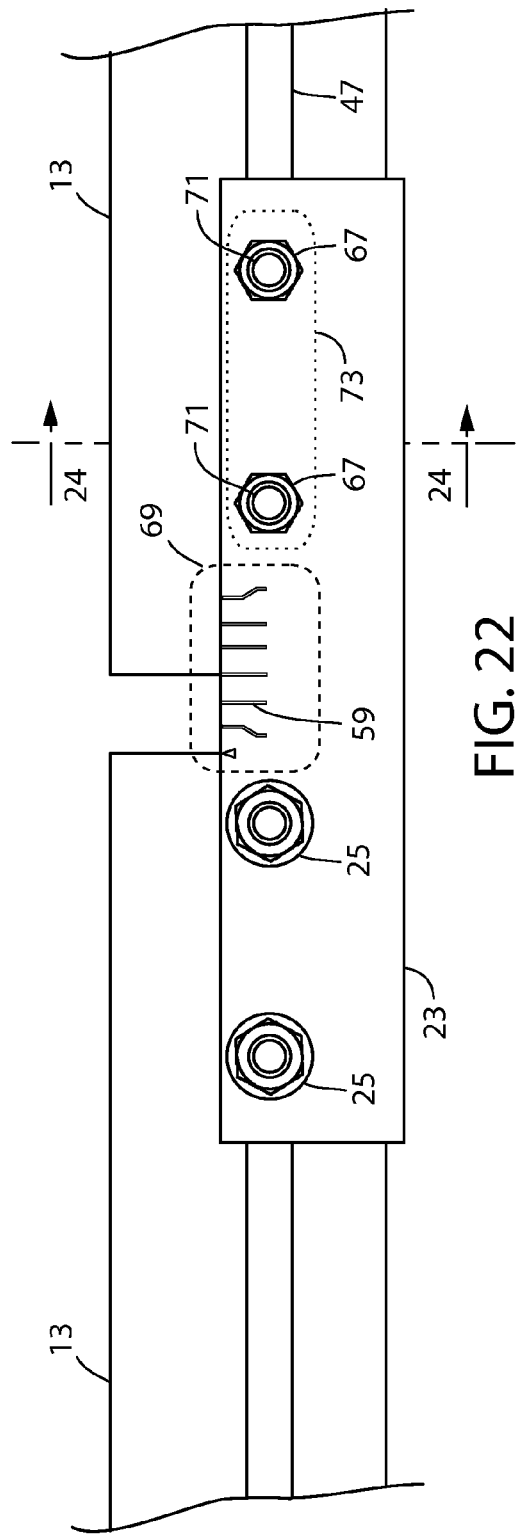
FIG. 22 shows an alternative rail splice bridging two rails, the rail splice including gap-setting indicia based on ambient temperature.
Figure 23:
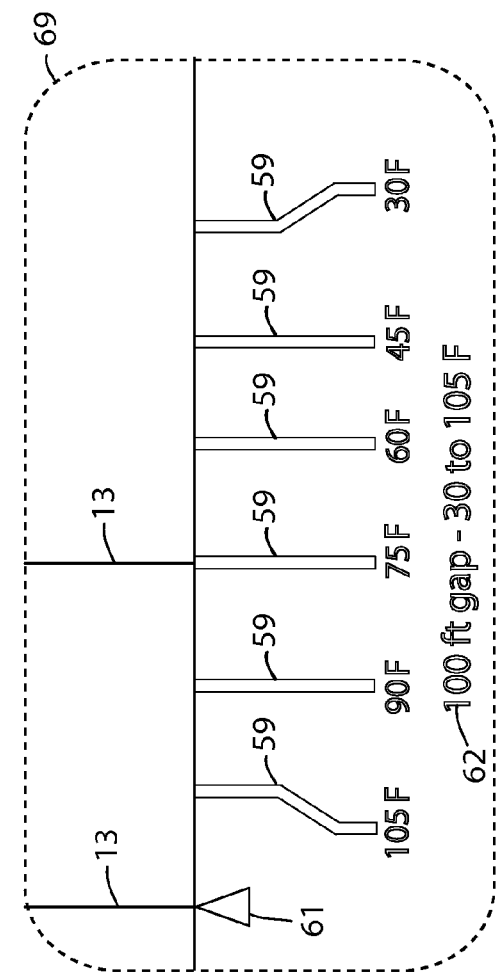
FIG. 23 shows a detailed view of a section of FIG. 22 showing the gap-setting indicia of the rail splice.

FIG. 22 shows the rail splice 23 mounted between the mounting rails 13 where the rail splice 23 includes indicia 59 for setting the gap. FIG. 23 shows the detailed section 69 of FIG. 22 showing the indicia 59 in detail. The indicia 59 of FIG. 19 are typical of what can be used in an environment with wide temperature variations, and are spaced and calibrated for a 40 ft. (12.19 m) rail length between gaps. The indicia 59 of FIG. 23 are spaced, for a moderate climate, such as Hawaii, with moderate temperate variations, and calibrated for a 100 ft. (30.48 m) rail length between gaps. As previously described for FIGS. 18 and 19, the mounting rail 13 on the left-hand side of FIG. 22 is lined up with the reference mark indicium 61 of FIG. 23. The mounting rail 13 on the right-hand side of FIG. 22 is lined up in a position between indicia 59 that approximately represents the present ambient temperature. For example, if the ambient temperature is 75° F. (23.9° C.), then the mounting rail 13 on the right-hand side of FIG. 22 would be lined up between the indicia 59 marked "70 F" and "80 F" as shown in FIG. 23.

Figure 24:
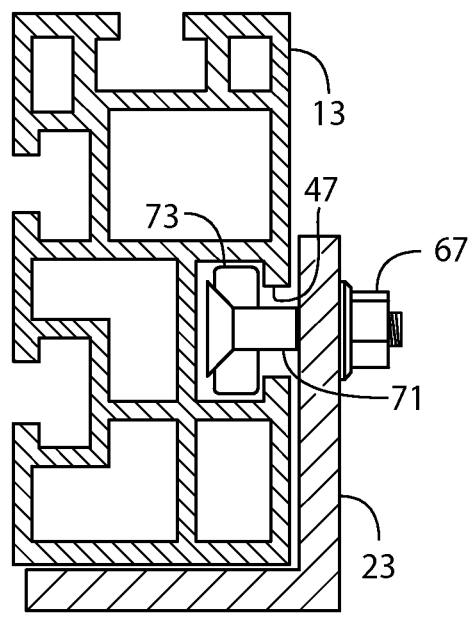
FIG. 24 shows a sectional view of FIG. 22.
Figure 25:
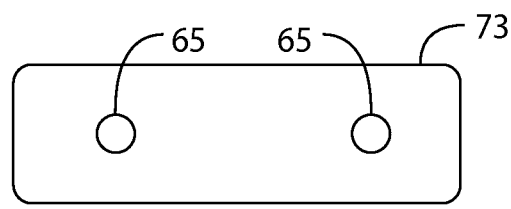
FIG. 25 shows a front view of a slidable mounting plate.
Figure 26:
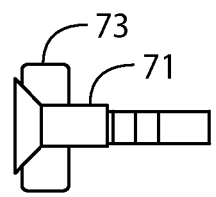
FIG. 26 shows a side view of screws and the slidable mounting plate in combination.

In FIG. 22, the fasteners 25 non-movably secure the mounting rail 13 on the left-hand side of the figure to rail splice 23 as previously described. The mounting rail 13 on the right-hand side of the figure is slidably secured in captive cooperation to the rail splice 23. In FIGS. 22 and 24 the rail splice 23 is held in slidable captive cooperation with the side groove 47 of the mounting rail 13 by a combination of a screw 71, polymer insert lock nuts 67, and a mounting plate 73. FIG. 25 shows a front view of the mounting plate 73. FIG. 26, in side view, shows the screw 71 secured to the mounting plate 73. In FIG. 25, the mounting plate 73 includes apertures 65. The apertures 65 are threaded to hold and secure the screws 71. A shoulder-stud can be used in place of the screw 71. It is also possible to replace the screws 71 with threaded standoffs that are integral to the mounting plate 73 if desired.

In FIGS. 18-25 the indicia 59 are calibrated to set a specific gap distance for a given ambient temperature indicated under the indicium 59. The calibrated distance is based on the material of the mounting rails 13 of FIGS. 18 and 22, and the distance between rail gaps. The gap distance can be calculated by the following formula:

$$Dg = a \cdot \Delta T \cdot L \tag{1}$$

where:
Dg=the gap distance
a=the coefficient of thermal expansion
$\Delta T$=the change in temperature
L=the length of each of the mounting rails between gaps For determining the minimum gap distance, $\Delta T = T_{max} - T_a$. Where, $T_{max}$ is the maximum possible anticipated temperature and $T_a$ is the ambient temperature indicated by the indicia 59. For example, if the mounting rails 13 of FIGS. 18 and 22 are made of aluminum, the coefficient of thermal expansion for aluminum is $12.3 \times 10^{-6}$ in./in. ° F. ($22.23 \times 10^{-6}$ m/m ° K), the total length of the mounting rails 13 without a gap, L=40 ft. (12.19 m), and the maximum anticipated temperature $T_{max}$=120° F. (48.9° C.), then the gap distance for an ambient temperature of 70° F. (21.1° C.) would be Dg= ($12.3 \times 10^{-6}$ in./in. ° F.)(120° F.-70° F.)(40 ft.)(12 in./ft)=0.3 in. (0.0076 m). For a ambient temperature of 0° F. (−17.8° C.), the gap distance would be Dg=($12.3 \times 10^{-6}$ in./in. ° F.)(120° F.-0° F.)(40 ft.)(12 in./ft.)=0.7 in. (0.018 m).

The indicia 59 on the rail splice 23 can be engraved, etched, silkscreen, printed, hot stamped or otherwise applied to the rail splice 23 of FIGS. 18 and 22 by a method appropriate for affixing the indicia 59 based on the material of the rail splice 23. Alternatively the indicia 59 can be printed, stamped, or otherwise applied to a label that is affixed to the rail splice 23.

The indicia 59 on the rail splice 23 can be calibrated for any desired length or mounting rail material or even solar panel frame material. For example, the spacing gauges can be calibrated for aluminum, steel, fiberglass, or carbon fiber rails. The spacing gauge 75 can be calibrated to any desired rail or solar panel frame material by changing the coefficient of linear expansion, "a," in equation (1) to the appropriate value for the desired material. While the rail length in the examples where either 40 ft. (12.19 m) or 100 ft. (30.48 m), the indicia 59 on the rail splice 23 can be calibrated for any rail length by simply changing L in equation (1).

Figure 27:
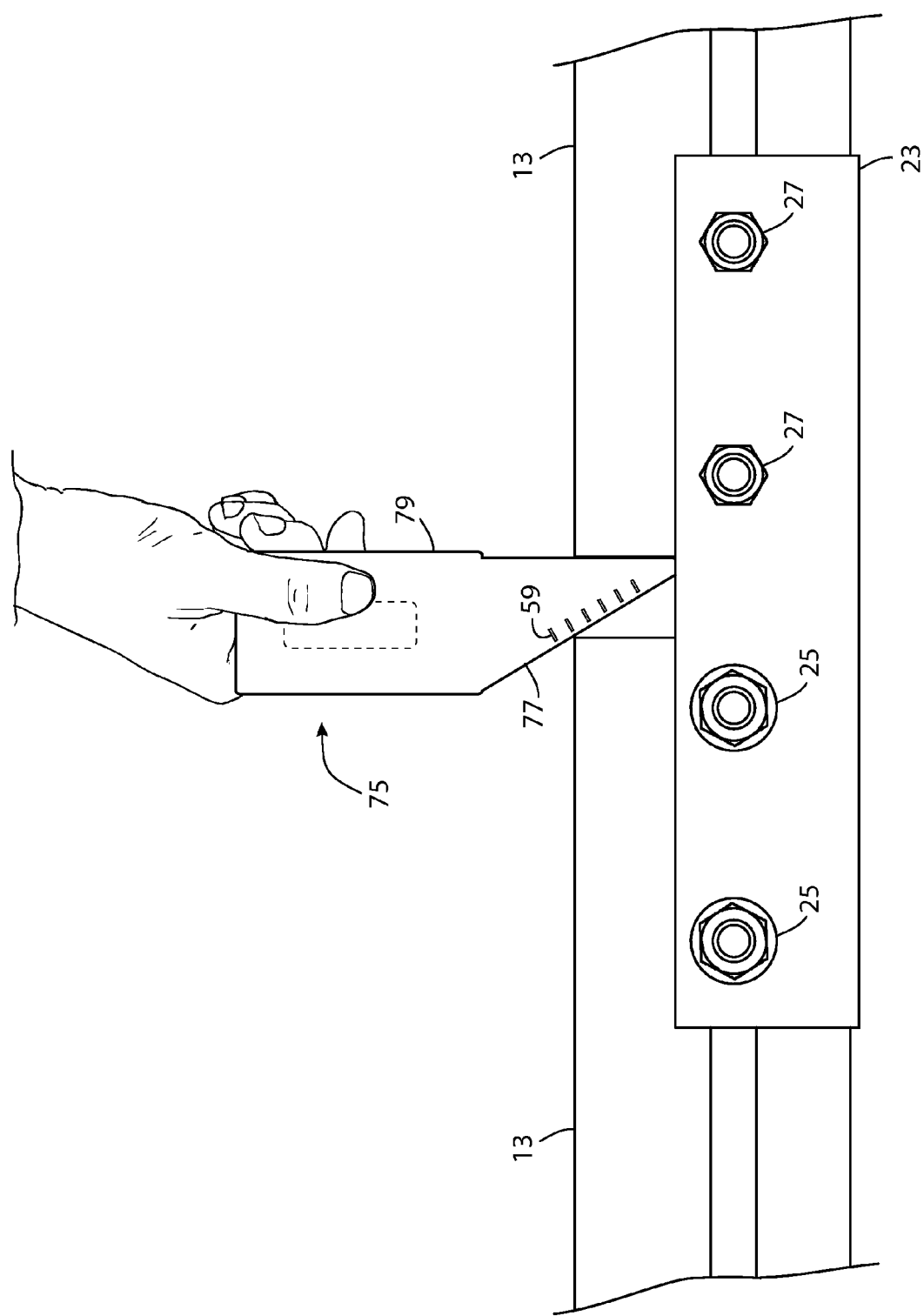
FIG. 27 shows mounting rails being spaced in accordance with ambient temperature by a spacing gauge with gap setting indicia.
Figure 28:
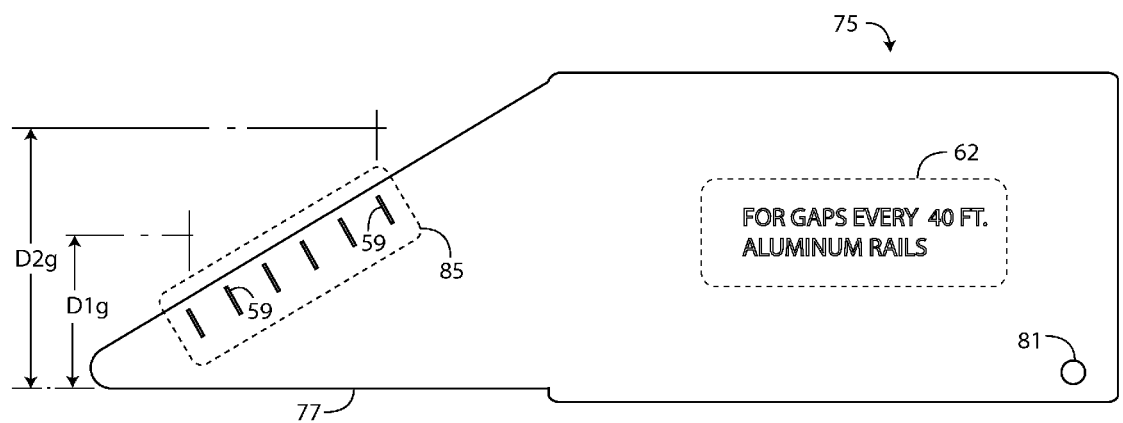
FIG. 28 shows the spacing gauge of FIG. 27.

Referring to FIG. 27, a spacing gauge 75 can be used for setting the gap distance between mounting rails 13 based on ambient temperature as an alternative to indicia 59 on the rail splice 23. The spacing gauge 75 can be made of plastic, metal, paper, laminated paper, or any desired material suitable for receiving indicia 59. Referring to FIGS. 27-28, the spacing gauge 75 includes a wedge portion 77. The wedge portion 77 includes indicia 59 for setting the gap distance between the rails of FIG. 27, in accordance with ambient temperature at the time of installation. The indicia 59 can be printed, engraved, stamped, silkscreened, or applied to spacing gauge 75 by any method appropriate for applying indicia 59 to the particular material of the spacing gauge 75. Alternatively the indicia 59 can be applied to a die cut, printed or stamped label and the label can be affixed to the spacing gauge 75. The spacing gauge 75 can optionally include a handle portion 79 for grasping the spacing gauge 75. Alternately a handle or grasping portion can be integrated into the wedge portion 77, if desired. Referring to FIG. 28, the spacing gauge 75 can include an aperture 81 for securing the spacing gauge 75 to a key ring. The spacing gauge 75 can also include instruction indicia 62 indicating how to use the spacing gauge 75, calibration information, or both. The calibration information can indicate the type of material and rail length the spacing gauge 75 was calibrated for.

Referring to FIG. 27, the following process can be used to adjust the gap distance between the mounting rails 13. The fasteners 25 associated with the mounting rail 13 on the left-hand side of the figure are tightened so rail splice 23 is immovably secured to that mounting rail 13. For a typical aluminum rail and aluminum splice, 20 ft-lb (27.12 Nm) of torque is suitable. Those skilled in the art will readily recognize the appropriate torque required to immovably secure the mounting rail 13 on the left-hand side of FIG. 27 to the rail splice 23. The floating fasteners 27 are tightened so to secure, in slidable captive cooperation, the mounting rail 13 on the right-hand side of FIG. 27 to the rail splice 23. The mounting rail 13 on the right-hand side of FIG. 27 is free to move with one degree of freedom longitudinally along the rail splice 23. The wedge portion 77 is inserted into the gap between the mounting rails 13 as shown until the indicium 59 corresponding to the ambient temperature, at the time of installation, aligns with the top edge of one of the rails.

Referring to FIG. 28, the indicia 59 sets the rail gap of FIG. 27 based on the width of the wedge portion 77 at the particular indicium 59. For example, indicium 59 positioned to the far left of the figure is at a position where the wedge portion 77 has a width of "D1g." When the spacing gauge 75 is inserted between the mounting rails 13 of FIG. 27 so that the top of the mounting rail 13 lines up with the indicium 59 positioned to the far left of the figure in FIG. 28, then the spacing gauge 75 will push the mounting rail 13 that is in slidable captive cooperation to a position corresponding to a gap of width "D1g." The indicium 59 positioned most right in the figure is positioned where the wedge portion 77 has a width of "D2g." When the spacing gauge 75 is inserted between the mounting rails 13 of FIG. 17 so that the top of the mounting rail 13 lines up with the indicium 59 positioned with the right most-position of the figure in FIG. 28, then the spacing gauge 75 will push the mounting rail 13 that is in slidable captive cooperation to a position corresponding to a gap of width "D2g."

Figure 29:
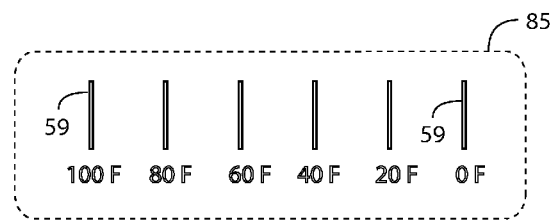
FIG. 29 shows a detailed section of FIG. 28 showing the gap-setting indicia.

FIG. 29 shows a detailed section 85 of FIG. 27 illustrating set of indicia 59. The indicia 59 are calibrated to set a specific gap distance for an anticipated temperature range and a given ambient temperature; the given ambient temperature is indicated under the indicium 59. The calibrated distance is based on the material of the mounting rails 13 of FIG. 27 and the distance between rail gaps. The gap distance can be calculated by equation (1). Different spacing gauges can be produced based on desired material using the coefficient of thermal expansion "a," temperature range using $\Delta T$, and various total length of joined rails without a gap.

As previously described, $\Delta T = T_{max} - T_a$. Where, $T_{max}$ is the maximum possible anticipated temperature and $T_a$ is the ambient temperature indicated by the indicia 59. For example, if the mounting rails 13 of FIG. 27 are made of aluminum, the coefficient of thermal expansion for aluminum is $12.3 \times 10^{-6}$ in./in. ° F. ($22.23 \times 10^{-6}$ m/m ° K). If the total length of mounting rails 13 without a gap, L=40 ft. (12.19 m). The maximum anticipated temperature $T_{max}$=120° F. (48.9° C.). The gap distance for an ambient temperature of 70° F. (21.1° C.) would be $D_g = (12.3 \times 10^{-6}$ in./in. ° F.$)(120°$ F.$-70°$ F.$)(40$ ft.$)(12$ in./ft.$) = 0.3$ in. (0.0076 m). For a ambient temperature of 0° F. (−17.8° C.), the gap distance would be $D_g = (12.3 \times 10^{-6}$ in./in. ° F.$)(120°$ F.$-0°$ F.$)(40$ ft.$)(12$ in./ft.$) = 0.7$ in. (0.018 m).

The following formula can be used to determine the placement of the indicia 59 along the wedge portion 77 of FIG. 28:

$$I_p = D_g / \sin(\theta) \quad (2)$$

where:
$I_p$=the distance from the tip of the wedge to the location of the indicium 59.
$\theta$=the angle between the opposing wedge sides.

For example, for a 40 ft. (12.19 m) length or rail between gaps, a rail material of aluminum, an angle between opposing wedge sides of 30° the indicium 59 for an ambient temperature of 0° F. (−17.8° C.) would be placed with respect to the tip of the wedge portion 77 at $I_p = (0.7$ in.$)/\sin(30°) = 1.4$ in. One of the advantages of placing the indicia 59 on the angled edge of the wedge portion 77 instead of the straight edge of the wedge portion 77 is that the distance between indicium 59 is greater than the actual gap distance and allows for easy placement of the gap.

Figure 30:
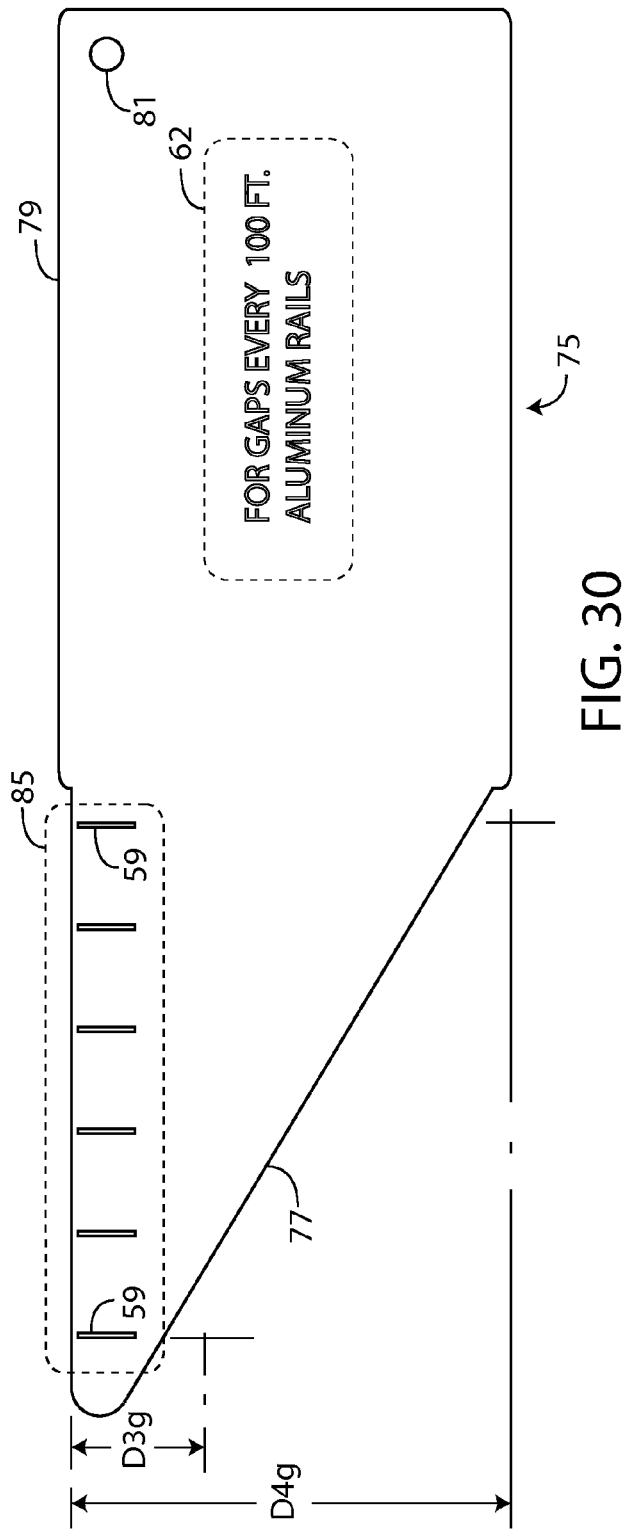
FIG. 30 shows the spacing gauge with alternatively positioned gap-setting indicia.
Figure 31:
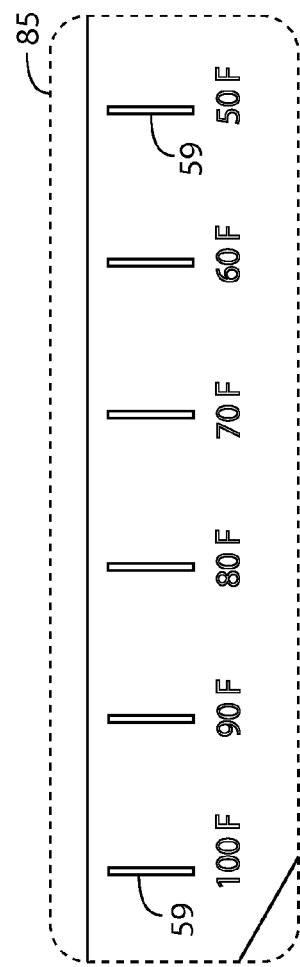
FIG. 31 shows a detailed section of FIG. 30 showing the gap-setting indicia of FIG. 30.

Nonetheless, it may be desirable to place the indicia 59 on the straight edge of the wedge portion 77. FIG. 30 shows the spacing gauge 75 with the indicia 59 on the straight edge of the wedge portion 77. The spacing gauge 75 can also include a handle portion 79, an aperture 81, and instruction indicia 62, as previously described. FIG. 31 shows a detailed section 85 of FIG. 30 illustrating the indicia 59. Referring to FIG. 30, the indicia 59 sets the rail gap of FIG. 27 based on the width of the wedge portion 77 at the particular indicium 59 as previously described. For example, indicium 59 positioned to the far left of the figure is at a position where the wedge portion 77 has a width of "D3g." When the spacing gauge 75 is inserted between the mounting rails 13 of FIG. 27 so that the top of the mounting rail 13 lines up with the indicium 59 positioned to the far left of the figure in FIG. 30, then the spacing gauge 75 will push the mounting rail 13 that is in slidable captive cooperation to a position corresponding to a gap of width "D3g." The indicium 59 positioned most right in the figure is positioned where the wedge portion 77 has a width of "D4g." When the spacing gauge 75 is inserted between the mounting rails 13 of FIG. 27 so that the top of the mounting rail 13 lines up with the indicium 59 positioned with the right most-position of the figure in FIG. 30, then the spacing gauge 75 will push the mounting rail 13 that is in slidable captive cooperation to a position corresponding to a gap of width "D4g."

The following formula can be used to determine the placement of the indicia 59 along the wedge portion 77 of FIG. 30, with $I_p$, $D_g$, and $\theta$, as previously defined for equation (2):

$$I_p = D_g / \tan(\theta) \quad (3)$$

For example, for a 100 ft. (30.48 m) length or rail between gaps, a rail material of aluminum, an angle between opposing wedge sides of 40° the indicium 59 for an ambient temperature of 0° F. (−17.8° C.) would be placed with respect to the tip of the wedge portion 77 at $I_p = (0.7$ in.$)/\tan(40°) = 1.4$ in. The gap distance is determined by equation (1), assuming $T_{max}$=120° F.: $D_g = (12.3 \times 10^{-6}$ in./in. ° F.$)(120°$ F.$-0°$ F.$)(100$ ft.$)(12$ in./ft.$) = 1.8$ in. (0.046 m).

In FIG. 27 showed a wedge portion 77 that included a straight edge parallel to the vertical side of the mounting rail 13 and an angled edge with respect to the vertical side of the mounting rail 13. It may be desirable to make a wedge portion 77 where both edges are angled with respect to the vertical side of the mounting rail 13. In that case, the placement of the indicia 59 can be determined by equation (2) except $\theta$ is the angle between the edge of the wedge portion 77 that includes the indicia 59 and a line originating at the vertex of the wedge that is parallel to the vertical edge of the mounting rail 13.

The spacing gauge 75 can be manufactured with calibration for any desired length or mounting rail 13 material, range of anticipated temperature extremes, or even solar panel frame material. For example, the spacing gauges can be calibrated for aluminum, steel, fiberglass, or carbon fiber rails. The spacing gauge 75 can be calibrated to any desired rail or solar panel frame material by changing the coefficient of linear expansion, "a," in equation (1) to the appropriate value for the desired material. While the rail length in the examples where either 40 ft. (12.19 m) or 100 ft. (30.48 m), the spacing gauge 75 can be calibrated for any rail length by simply changing L in equation (1).

Apparatus and methods for compensating for thermal expansion and contraction of solar panels rail mounted systems has been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. An spacing gauge for setting a gap between two mounting rails for a solar system, comprising:
    a wedge shaped portion with a first edge and a second opposing edge; and
    indicia along the first edge, each indicium representing a gap setting distance between the two mounting rails for a given ambient temperature.

2. The spacing gauge of claim 1 wherein;
    each mounting rail including a mounting rail length; and
    each indicium position is proportional to a coefficient of thermal expansion of a rail material and proportional to the mounting rail length.

3. The spacing gauge of claim 1 wherein placement of the indicia along the first edge is determined by an equation $Dg = A \cdot \Delta T \cdot L$ and $Ip = Dg/\sin(\theta)$, where: Dg is the gap setting distance, A is a coefficient of thermal expansion, $\Delta T$ is a difference between a maximum anticipated temperature and the given ambient temperature for the indicium, L is a length of each of the two mounting rails, Ip is a distance from a wedge vertex to a location of the indicium, and $\theta$ is an angle between the first and the second opposing edge of the wedge shaped portion.

4. The spacing gauge of claim 1 wherein placement of the indicia along the first edge is determined by a first equation $Dg = A \cdot \Delta T \cdot L$ and a second equation $Ip = Dg/\tan(\theta)$, where:
    Dg is the gap setting distance, A is a coefficient of thermal expansion, $\Delta T$ is a difference between a maximum anticipated temperature and the given ambient temperature for the indicium, and L is a length of each of the two mounting rails, Ip is a distance from a wedge vertex to a location of the indicium, and $\theta$ is an angle between the first and the second opposing edge of the wedge shaped portion.

* * * * *